US010605012B2

(12) United States Patent
Loose-Mitchell et al.

(10) Patent No.: US 10,605,012 B2
(45) Date of Patent: Mar. 31, 2020

(54) DROP IN ANTI-ROTATION KEY

(71) Applicant: Vetco Gray Inc., Houston, TX (US)

(72) Inventors: William Alexander Loose-Mitchell, Houston, TX (US); Mayur Mansukh, Houston, TX (US); Joseph William Pallini, Jr., Houston, TX (US); Dennis Robert Martinchich, Houston, TX (US)

(73) Assignee: Vetco Gray, LLC, Houston, TX (US)

( * ) Notice: Subject to any disclaimer, the term of this patent is extended or adjusted under 35 U.S.C. 154(b) by 235 days.

(21) Appl. No.: 15/151,032

(22) Filed: May 10, 2016

(65) Prior Publication Data

US 2017/0328138 A1 Nov. 16, 2017

(51) Int. Cl.
*F16L 15/08* (2006.01)
*E21B 17/043* (2006.01)

(52) U.S. Cl.
CPC ............ *E21B 17/043* (2013.01); *F16L 15/08* (2013.01)

(58) Field of Classification Search
CPC ....................................................... F16L 15/08
USPC ........................................................... 285/92
See application file for complete search history.

(56) References Cited

U.S. PATENT DOCUMENTS

| 2,440,257 | A | * | 4/1948 | Edwards | ................. | E21B 17/06 |
| | | | | | | 285/355 |
| 3,948,545 | A | * | 4/1976 | Bonds | .................... | F16L 37/002 |
| | | | | | | 285/91 |
| 4,261,599 | A | | 4/1981 | Streed | | |
| 4,902,047 | A | * | 2/1990 | Marietta | ................. | F16L 15/08 |
| | | | | | | 285/92 |
| 5,785,357 | A | * | 7/1998 | Foster | ..................... | F16L 15/08 |
| | | | | | | 285/92 |
| 7,146,704 | B2 | | 12/2006 | Otten et al. | | |
| 7,887,098 | B2 | * | 2/2011 | Aas | ......................... | F16L 15/08 |
| | | | | | | 285/92 |
| 8,474,876 | B2 | * | 7/2013 | Watterson, II | .......... | F16L 15/08 |
| | | | | | | 285/91 |
| 8,690,200 | B1 | * | 4/2014 | Patterson, Jr. | .......... | E21B 17/08 |
| | | | | | | 285/92 |

(Continued)

FOREIGN PATENT DOCUMENTS

FR 2 524 112 A1 9/1983

OTHER PUBLICATIONS

International Search Report and Written Opinion issued in connection with corresponding PCT Application No. PCT/US2017/027882, dated Aug. 31, 2017.

*Primary Examiner* — David Bochna
(74) *Attorney, Agent, or Firm* — Hogan Lovells US LLP

(57) ABSTRACT

A tubular member connection system includes a box having an inner diameter surface and internal box threads. A pin has an outer diameter surface and external pin threads, the pin threads shaped to mate with the box threads to releasably secure the pin to the box so that the pin and the box are aligned along a common central axis. A slot is located in one of the inner diameter surface and the outer diameter surface, the slot having a pair of sidewalls. An anti-rotation profile is located in the other of the inner diameter surface and the outer diameter surface. A key is sized to fit within the slot and have a key profile shaped to engage the anti-rotation profile and prevent relative rotational movement between the box and the pin.

18 Claims, 3 Drawing Sheets

(56) References Cited

U.S. PATENT DOCUMENTS

| | | | |
|---|---|---|---|
| 8,950,785 B2* | 2/2015 | Raynal | F16L 15/08 285/92 |
| 9,133,968 B2* | 9/2015 | Elrick | E21B 17/046 |
| 9,410,647 B2* | 8/2016 | Steen | F16L 15/08 |
| 9,708,865 B2* | 7/2017 | Steen | F16L 15/08 |
| 2011/0260445 A1* | 10/2011 | Watterson, II | F16L 15/08 285/91 |
| 2014/0103640 A1* | 4/2014 | O'Dell | F16L 15/08 285/91 |
| 2014/0166308 A1 | 6/2014 | Steen et al. | |
| 2014/0167408 A1* | 6/2014 | Steen | F16L 15/08 285/330 |

\* cited by examiner

DROP IN ANTI-ROTATION KEY

BACKGROUND

1. Field of the Disclosure

This invention relates in general to threaded tubular connections, such as for large diameter pipes used in offshore hydrocarbon drilling and production operations, and particularly to a device to prevent rotation of tubular members after they are made up.

2. Background of the Disclosure

Hydrocarbon production wells can have several strings of casing of differing diameters cemented in the well. Each casing string can be made up of joints of pipe having threaded ends that are secured together. The portion of the connector having internal threads is commonly known as a female connector or box. The portion of the connector having external threads is commonly known as a male connector or pin. Some casing joints have a pin member at a first end and a box member at a second end. Normally, the operator relies on the friction of the made-up joint to prevent the threaded connectors from loosening while running the string into the well. With larger diameter casing, for example, from 16 inch to 36 inch, the friction of the made-up connector may be inadequate to prevent loosening while running the casing.

Operators have employed anti-rotation keys to prevent loosening. Some current anti-rotation key designs require specialty tools to install the locking mechanism. Some designs require explosive powered guns to set the locking mechanism. Other designs can be difficult to unlock in the event it is necessary to unscrew the pipe connection. Other current anti-rotation key designs require drilling a hole for the locking member after the pipe connection is made up. Drilling can result in metal shavings falling down the pipe string, which can cause issues. Further, drilling a made up pipe connection requires a complex drill. If disconnected, then reconnected, it may be necessary to drill another hole, and that hole may overlap the previously drilled hole, limiting the locking capacity.

In other current casing setups, the anti-rotation key can be inserted through a hole in the box and a hammer or wrench may be employed to position and secure the key. The anti-rotation key of such systems can have teeth that bite into the connector members, either upon insertion or when the pin starts to rotate out of the box, applying an axial compressive load on the connector members and permanently deforming the connector members in order to prevent relative rotation between the box and the pin. This may also affect the connector load path and initial loading condition and result in a reduction of cyclic load life.

SUMMARY OF THE DISCLOSURE

Systems and methods described herein provide an anti-rotation key that produces significantly less axial compressive load than some current anti-rotation devices. Embodiments of this disclosure provide an anti-rotation key that does not create a radial or axial compression of the threaded connection, does not generate a radial load between the pin and the box, and does not change the load path through the threaded connection, improving the fatigue life of the threaded connection.

In accordance with an embodiment of this disclosure, a tubular member connection system includes a box having an inner diameter surface, internal box threads, and an annular box shoulder on the inner diameter surface of the box. The tubular member connection system also includes a pin having an outer diameter surface, external pin threads, and an annular pin lip at an end surface of the pin. The pin threads are shaped to mate with the box threads to releasably secure the pin to the box so that the pin and the box are aligned along a common central axis. A slot is located in one of the inner diameter surface and the outer diameter surface, the slot having a pair of sidewalls. An anti-rotation profile is located in the other of the inner diameter surface and the outer diameter surface. A key is sized to fit within the slot and has a key profile shaped to engage the anti-rotation profile and prevent relative rotational movement between the box and the pin.

In an alternate embodiment of this disclosure, a tubular member connection system includes a pin having an outer diameter surface, external pin threads, and an annular pin lip at a first end of the pin. A first tubular member extends from the pin in a direction opposite the first end of the pin. The tubular member connection system also includes a box having an inner diameter surface, internal box threads, and an annular box shoulder facing towards a first end of the box on the inner diameter surface of the box. The box threads are shaped to mate with the pin threads to releasably secure the pin to the box so that the pin and the box are aligned along a common central axis. A second tubular member extends from the box in a direction opposite the box shoulder. A slot is located in the outer diameter surface of the pin and an anti-rotation profile is located in the inner diameter surface of the box. A key is sized to fit within the slot and has a key profile extending radially outward from the key and shaped to engage the anti-rotation profile when the key is located in the slot.

In yet another embodiment of this disclosure, a method for connecting tubular members includes providing a box having an inner diameter surface, internal box threads, and an annular box shoulder on the inner diameter surface of the box. A pin is provided having an outer diameter surface, external pin threads, and an annular pin lip at an end surface of the pin. The pin threads are mated with the box threads to releasably secure the pin to the box so that the pin and the box are aligned along a common central axis. A key is located within a slot so that a key profile of the key engages an anti-rotation profile and prevents relative rotational movement between the box and the pin. The slot is located in one of the inner diameter surface and the outer diameter surface and the anti-rotation profile is located in the other of the inner diameter surface and the outer diameter surface.

BRIEF DESCRIPTION OF THE DRAWINGS

So that the manner in which the features, advantages and objects of the disclosure, as well as others which will become apparent, are attained and can be understood in more detail, more particular description of the embodiments briefly summarized above may be had by reference to the embodiment thereof which is illustrated in the appended drawings, which drawings form a part of this specification. It is to be noted, however, that the drawings illustrate example embodiments of the disclosure and are therefore not to be considered limiting of its scope as the disclosure may admit to other equally effective embodiments.

DETAILED DESCRIPTION

Figure 1:
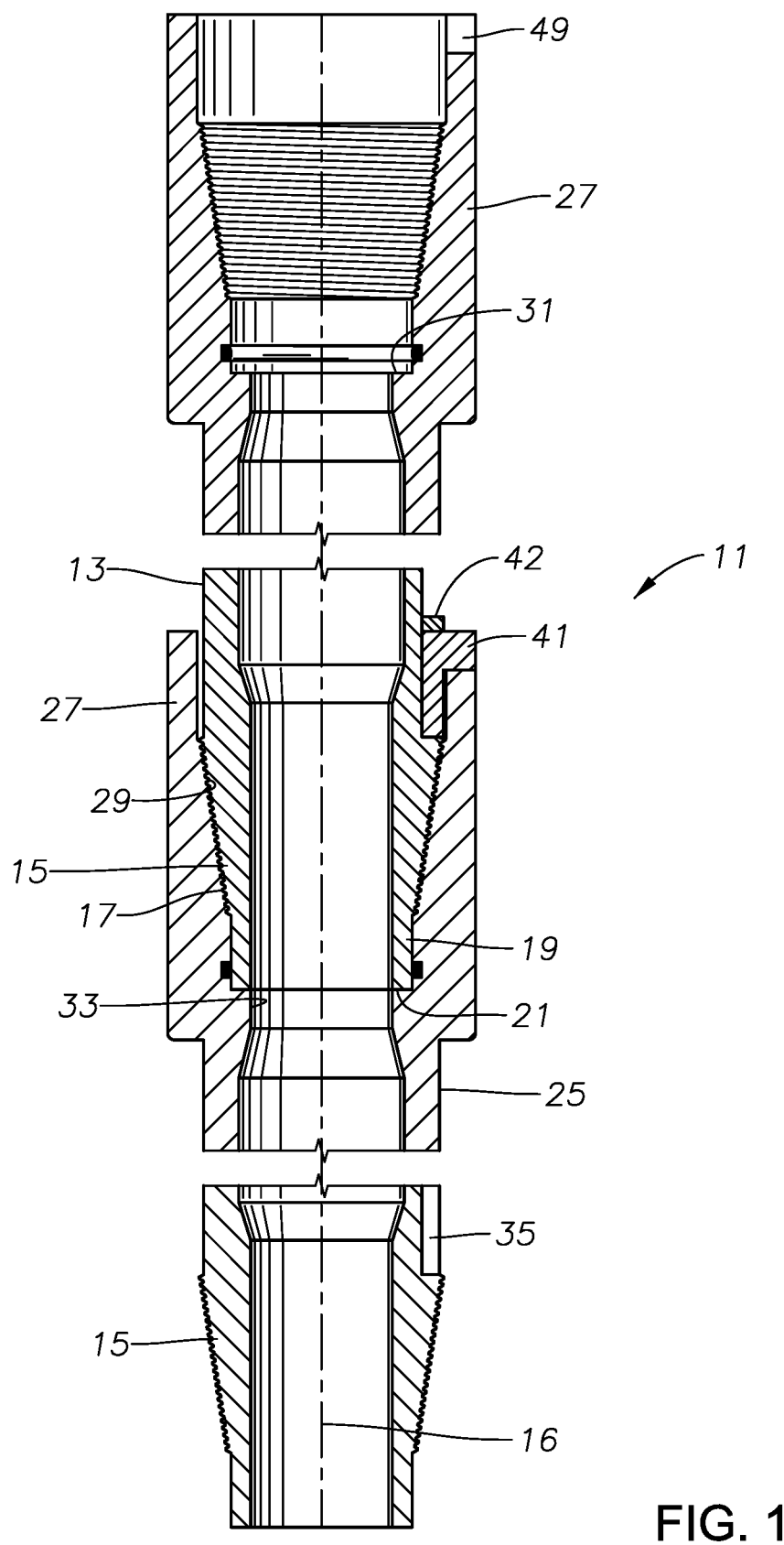
FIG. 1 is a section view of a tubular member connection system in accordance with an embodiment of this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, tubular member connection system 11 includes a first or upper tubular member 13 with pin 15 formed on an end of upper tubular member 13. The terms "upper" and "lower" are used only for convenience as pin 15 could be located on the upper end of tubular member 13 if the tubular member is inverted. Pin 15 has a longitudinal central axis 16 and external pin threads 17 located on a conical outer diameter surface. Pin 15 has a nose 19 on a first end of pin 15 that is located on an axially outer side of pin threads 17. Pin lip 21 is an annular surface at an end surface of nose 19 of pin 15. Upper tubular member 13 extends from pin 15 in a direction opposite nose 19 of pin 15.

Tubular member connection system 11 also includes a second or lower tubular member 25 with box 27 formed on an end of lower tubular member 25. Box 27 has internal box threads 29 located on an inner diameter surface of box 27. Box threads 29 are shaped to mate with pin threads 17 to releasably secure pin 15 to box 27 so that pin 15 and box 27 are aligned along common central axis 16. Box 27 has annular box shoulder 31 on the inner diameter surface of box 27. Box shoulder 31 faces towards an open end or first end of box 27. Box shoulder 31 is sized to mate with pin lip 21 when pin 15 is threaded into box 27. Lower tubular member 25 extends from box 27 in a direction opposite box shoulder 31.

Upper tubular member 13 can have a second box 27 at an opposite end of upper tubular member 13 from pin 15 and lower tubular member 25 can have a second pin 15 at an opposite end of lower tubular member from box. A pin 15 of a next or adjacent tubular member can be releasably secured to box 27 of upper tubular member 13 to form a tubular string. Similarly, a box 27 of a prior or adjacent tubular member can be releasably secured to pin 15 of lower tubular member 25. Upper tubular member 13 and pin 15 as well as lower tubular member and box 27 can all include an inner bore 33. Inner bore 33 of upper tubular member 13, pin 15, lower tubular member, and box 27 can fluidly register with each other and can be used to transfer fluids and associated matter along a length of the tubular string.

Figure 2:
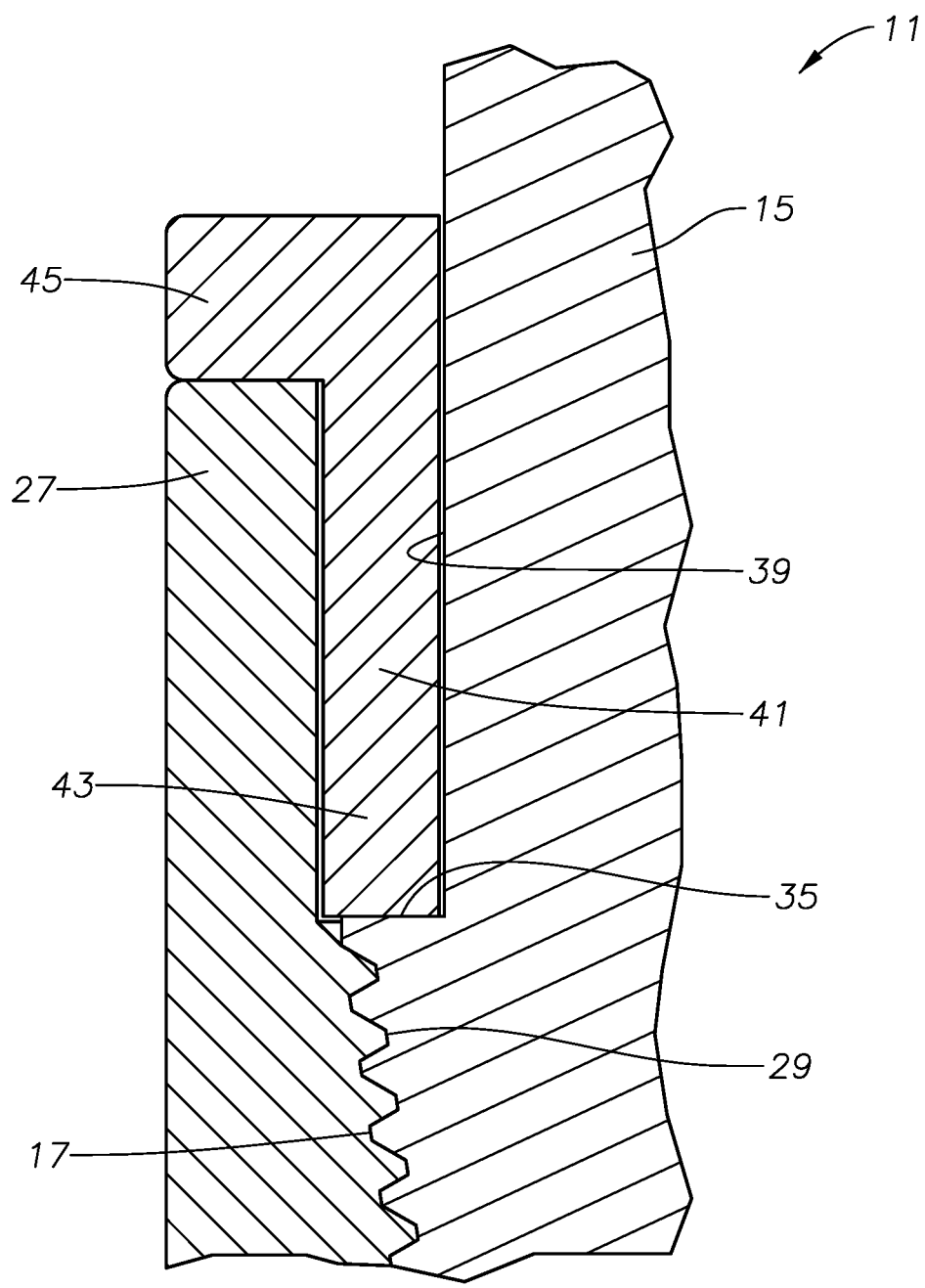
FIG. 2 is a section view of a portion of a tubular member connector system in accordance with an embodiment of this disclosure.

Slot 35 can be formed in the inner diameter surface of box 27 or the outer diameter surface of pin 15. In the example embodiment of FIG. 1, slot 35 is formed in the outer diameter surface of pin 15 and extends radially inward from the outer diameter surface of pin 15. Slot 35 extends generally parallel to central axis 16. Slot 35 has a pair of sidewalls 37 that extend generally parallel to central axis 16 and define the side surfaces of slot 35. A slot bottom extends between sidewalls 37. Slot 35 has a radial depth that is less than the thickness of the sidewall of pin 15 so that slot 35 has a back wall 39 (FIG. 2). Slot 35 can have planar sidewalls 37 and a planar back wall 39. In alternate embodiments, back wall 39 can be curved, for example having a similar curvature as the outer diameter surface of the outer diameter surface of pin 15 or the inner diameter surface of box 27.

Figure 3:
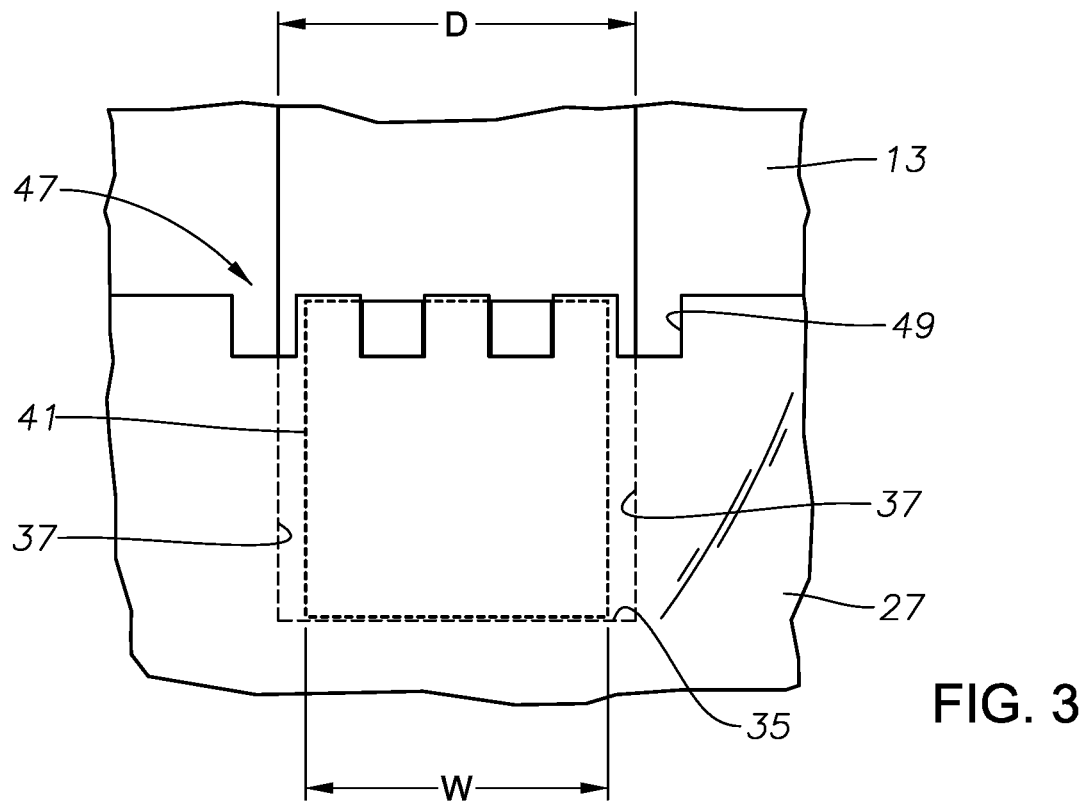
FIG. 3 is an elevation view of a portion of a tubular member connector system in accordance with an embodiment of this disclosure.

Looking at FIG. 3, key 41 can be sized to fit within slot 35. A width W of key 41 can be slightly smaller than distance D between sidewalls 37 of slot 35 so that key 41 can slide easily into slot 35. Sidewalls 37 of slot 35 can engage sides of key 41 so that key 41 has limited circumferential movement within slot 35. Retainer 42 (FIG. 1) can be used to ensure that key 41 remains within slot 35. Retainer 42 can be a screw, a latch, or other type of fastener or retaining mechanism.

Figure 4:
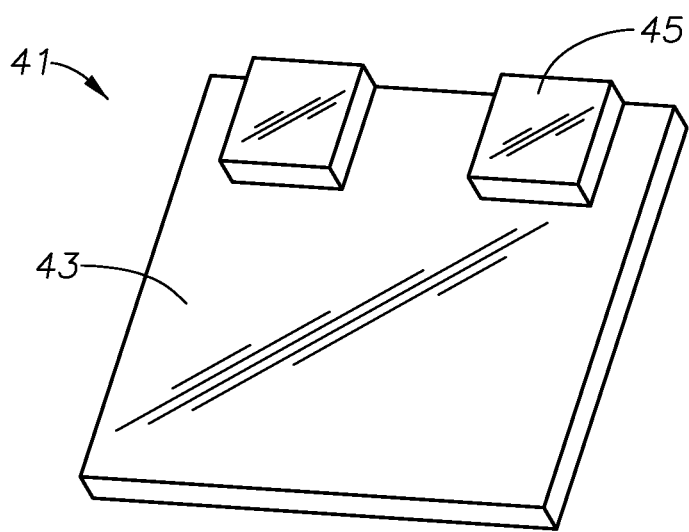
FIG. 4 is a perspective view of a key of a tubular member connection system in accordance with an embodiment of this disclosure.

Looking at FIG. 4, key 41 can include a main key body 43 and key profile 45. Key body 43 and key profile 45 can be a single integrated member or alternately, key profile 45 can be one or more separate members that are secured to key body 43. In the example of FIG. 4, key profile 45 extends radially outward from key body 43 and includes a plurality of protrusions. In embodiments where slot 35 is located on the inner diameter surface of box 27, key profile 45 can instead extend radially inward from key body 43. The protrusions of the example configuration are generally square shaped. In other alternate embodiments, key profile 45 can have other shapes, such as rectangular, triangular, or curved shaped members. A back face of key 41 can be planar or in alternate embodiments the back face of key 41 can be a curved surface, as applicable, to match the shape of back wall 39 of slot 35.

Anti-rotation profile 47 can be located on an opposite surface to slot 35. In the example of FIGS. 1-2, anti-rotation profile 47 is in an inner diameter surface of box 27. In alternate example embodiments where slot 35 is in an inner diameter surface of box 27, anti-rotation profile 47 can be in an outer diameter surface of pin 15. When key 41 is located within slot 35 anti-rotation profile 47 can engage key profile 45 to prevent relative rotational movement between box 27 and key 41. The relative rotational loads will be transferred between anti-rotation profile 47 and key profile 45, and to sidewalls 37 of slot 35. In the example embodiments shown, anti-rotation profile 47 includes a series of grooves 49. Grooves 49 can extend through a sidewall of box 27, starting from the open end of box 27. In alternate embodiments, grooves 49 can extend into the sidewall of box 27 but not extend all the way through the sidewall of box 27.

Slot 35 is located on pin 15 in a position such that each of the plurality of protrusions of key profile 45 can engage one of the grooves 49 when pin 15 is threaded into box 27 until pin lip 21 engages box shoulder 31. In order to ensure that slot 35 will rotationally align with anti-rotation profile 47 when pin 15 is releasably secured to box 27 in a fully made-up position, the location of slot 35 can be pre-determined by clocking the final made-up position of either slot 35 or anti-rotation profile 47 or both. This clocking procedure can be completed by making up pin 15 with a dummy box that has an identical configuration of box threads 29 and relative location of anti-rotation profile 47 as actual box 27. Due to this clocking procedure to determine the position of slot 35 on pin 15, each of the protrusions of key profile 45 can engage one of the grooves 49 of anti-rotation profile 47 when pin 15 is threaded to box 27 to a fully made-up position.

In order to accommodate a range of final positions of slot 35, the number of protrusions of key profile 45 is less than the number of grooves of anti-rotation profile 47. In this way, when pin 15 is releasably secured to box 27 there are options as to which grooves of anti-rotation profile 47 are engaged by the protrusions of key profile 45. For example, looking at the embodiment of FIG. 4, there is one groove on either side of key 41 that do not house any protrusions of key profile 45. In alternate examples the number of empty grooves on either side of key 41 can be as few as zero or can be two or more.

In addition, the difference between width W of key 41 and distance D between sidewalls 37 of slot 35 allows key profile 45 to be placed in a range of locations in slot 35 to allow key profile 45 to engage anti-rotation profile 47, after the threaded connection has been made up between pin 15 and box 27.

In an example of operation, box 27 can be provided on lower tubular member 25. Anti-rotation profile 47 can be formed on an inner diameter surface of box 27. As an example anti-rotation profile 47 can be a series of grooves machined into or entirely through a sidewall of box 27. Pin 15 can be provided on upper tubular member 13. Slot 35 can be formed in an outer diameter surface of pin 15, such as by machining slot 35 in pin 15. The location of slot 35 can be clocked so that slot 35 will align with anti-rotation profile 47 when pin 15 and box 27 are fully made-up.

Nose 19 of pin 15 can then be located within box 27 and pin 15 can be rotated so that box threads 29 can mate with pin threads 17. Pin 15 can be threaded to box 27 in a make-up rotation direction until pin lip 21 engages box shoulder 31. Once pin 15 is fully made-up with box 27, key 41 can be inserted into slot 35. Key 41 is inserted into slot 35 by simply sliding key 41 into slot 35 in an axial direction. No special tools or significant force is required to slide key 41 into slot 35. Sliding key 41 into slot 35 can be done by an operator by hand. Slot 35 has a sufficient axial height that key 41 can easily enter slot 35. No material of pin 15, box 27, or key 41 is required to be deformed or cut during the step of sliding key 41 into slot 35. A bottom end of key body 43 can enter slot 35 first. When sliding key 41 into slot 35, protrusions of key profile 45 can be rotationally aligned with grooves 49 of anti-rotation profile 47 so that protrusions of key profile 45 can enter into grooves 49. The interaction of key profile 45 with grooves 49 of anti-rotation profile 47, together with the engagement of a side of key 41 with a sidewall 37 of slot 35 will restrict relative rotation between pin 15 and box 27. Retainer 42 can be inserted so that key 41 remains within slot 35.

Tubular member connection system 11 may not need to be unscrewed once made up. On some occasions, however, the operator might wish to unscrew tubular member connection system 11. In such a case, an operator can manually remove retainer 42 then key 41 and pin 15 can be rotated relative to box 27 in an unscrewing direction to release pin 15 from box 27 so that upper tubular member 13 can be separated from lower tubular member 25.

Systems and methods disclosed herein are therefore well adapted to carry out the objects and attain the ends and advantages mentioned, as well as others inherent therein. While an example embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of this disclosure and the scope of the appended claims. The terms "vertical", "horizontal", "upward", "downward", "top", and "bottom" are used herein only for convenience because the tubular members may be installed in various positions.

What is claimed is:

1. A tubular member connection system, comprising:
   a box having an inner diameter surface, internal box threads, and an annular box shoulder on the inner diameter surface of the box;
   a pin having an outer diameter surface, external pin threads, and an annular pin lip at an end surface of the pin, the pin threads shaped to mate with the box threads to releasably secure the pin to the box so that the pin and the box are aligned along a common central axis;
   a slot in one of the inner diameter surface and the outer diameter surface, the slot having a pair of sidewalls and a back wall integral to the box or the pin;
   an anti-rotation profile comprising an unsmooth surface and extending at least partially around the circumference of the other of the inner diameter surface and the outer diameter surface; and
   a key sized to fit within the slot and having a key profile shaped to engage the anti-rotation profile and prevent relative rotational movement between the box and the pin, wherein the anti-rotation profile includes a plurality of grooves and the key profile includes a plurality of protrusions located to fit within the plurality of grooves.

2. The system according to claim 1, wherein a number of grooves is greater than a number of protrusions.

3. The system according to claim 1, wherein the slot extends generally parallel to the central axis.

4. The system according to claim 1, further comprising a retainer selectively retaining the key in the slot.

5. The system according to claim 1, wherein the slot is positioned such that the slot radially aligns with the anti-rotation profile when the pin is threaded to the box until the pin lip engages the box shoulder.

6. The system according to claim 1, wherein the slot extends radially inward from the outer diameter surface of the pin.

7. The system according to claim 1, wherein the anti-rotation profile includes a plurality of grooves extending radially through a sidewall of the box from an end of the box.

8. A tubular member connection system, comprising:
   a pin having an outer diameter surface, external pin threads, and an annular pin lip at a first end of the pin;
   a first tubular member extending from the pin in a direction opposite the first end of the pin;
   a box having an inner diameter surface, internal box threads, and an annular box shoulder facing towards a first end of the box on the inner diameter surface of the box, the box threads shaped to mate with the pin threads to releasably secure the pin to the box so that the pin and the box are aligned along a common central axis;
   a second tubular member extending from the box in a direction opposite the box shoulder;
   a slot in the outer diameter surface of the pin;

an anti-rotation profile comprising an unsmooth surface and extending at least partially around the circumference of the inner diameter surface of the box; and a key sized to fit within the slot and having a key profile extending radially outward from the key and shaped to engage the anti-rotation profile when the key is located in the slot, wherein the anti-rotation profile includes a plurality of grooves and the key profile includes a plurality of protrusions located to fit within the plurality of grooves.

9. The system according to claim 8, wherein a number of protrusions is less than a number of grooves and each protrusion engages one of the slots when the key is located in the slot.

10. The system according to claim 8, wherein the slot is positioned on the pin such that the slot rotationally aligns with the anti-rotation profile when the pin is threaded to the box until the pin lip engages the box shoulder.

11. The system of claim 8, wherein the first tubular member has a second box at an opposite end of the first tubular member from the pin, the second box being releasable secured to a second pin to form a tubular string.

12. A method for connecting tubular members, the method comprising:

providing a box having an inner diameter surface, internal box threads, and an annular box shoulder on the inner diameter surface of the box;

providing a pin having an outer diameter surface, external pin threads, and an annular pin lip at an end surface of the pin, mating the pin threads with the box threads to releasably secure the pin to the box so that the pin and the box are aligned along a common central axis; and locating a key within a slot so that a key profile of the key engages an anti-rotation profile comprising an unsmooth surface and extending at least partially around the circumference of the box or the pin, thereby preventing relative rotational movement between the box and the pin, the slot having a pair of sidewalls and a back wall integral to the box or the pin; wherein the slot is located in one of the inner diameter surface and the outer diameter surface and the anti-rotation profile is located in the other of the inner diameter surface and the outer diameter surface; and the anti-rotation profile includes a plurality of grooves and the key profile includes a plurality of protrusions and locating the key within the slot includes fitting the protrusions within the plurality of grooves.

13. The method according to claim 12, wherein a number of protrusions is less than a number of grooves, and wherein locating the key within the slot includes locating each protrusion within one of the grooves.

14. The method according to claim 12, wherein the slot extends generally parallel to the central axis and locating the key within the slot includes sliding the key in a generally axial direction into the slot.

15. The method according to claim 12, further comprising retaining the key within the slot with a retainer.

16. The method according to claim 12, wherein mating the pin threads with the box threads to releasably secure the pin to the box includes mating the pin threads with the box threads until the pin lip engages the box shoulder and the slot is rotationally aligned with the anti-rotation profile.

17. The method according to claim 12, wherein the slot extends radially inward from the outer diameter surface of the pin.

18. The method according to claim 12, wherein the anti-rotation profile includes a plurality of grooves extending radially through a sidewall of the box from an end of the box.

* * * * *